(12) United States Patent
Do et al.

(10) Patent No.: US 8,937,697 B2
(45) Date of Patent: Jan. 20, 2015

(54) OPTICAL PLATE, METHOD OF MANUFACTURING THE OPTICAL PLATE, DISPLAY APPARATUS, AND METHOD OF MANUFACTURING THE DISPLAY APPARATUS

(75) Inventors: Hee-Wook Do, Cheonan-si (KR); Duck-Jong Suh, Seoul (KR); Kyeong Hyeon Kim, Seongnam-si (KR); Jeong-Uk Heo, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 475 days.

(21) Appl. No.: 13/166,514

(22) Filed: Jun. 22, 2011

(65) Prior Publication Data

US 2012/0019745 A1    Jan. 26, 2012

(30) Foreign Application Priority Data

Jul. 22, 2010    (KR) .................. 10-2010-0070820

(51) Int. Cl.
*G02F 1/1335* (2006.01)
*G02B 5/30* (2006.01)

(52) U.S. Cl.
CPC .................................. *G02B 5/3083* (2013.01)
USPC ........................................................... 349/96

(58) Field of Classification Search
USPC .................................................. 349/96, 119
See application file for complete search history.

(56) References Cited

U.S. PATENT DOCUMENTS

| 2002/0085280 A1* | 7/2002 | Jung .............................. 359/465 |
| 2005/0146659 A1* | 7/2005 | Ishii et al. ..................... 349/117 |
| 2010/0073601 A1 | 3/2010 | Daiku |
| 2011/0216277 A1* | 9/2011 | Chen et al. ..................... 349/117 |

FOREIGN PATENT DOCUMENTS

| CN | 100373236 | 3/2008 |
| CN | 101183177 | 5/2008 |
| JP | 2004-279946 | 10/2004 |
| KR | 10-2002-0059028 | 7/2002 |
| KR | 10-2007-0006116 | 1/2007 |
| TW | 200925653 | 6/2009 |

* cited by examiner

*Primary Examiner* — Lucy Chien
(74) *Attorney, Agent, or Firm* — H.C. Park & Associates, PLC

(57) ABSTRACT

In the optical plate and a method of manufacturing the optical plate, a display apparatus and a method of manufacturing the display apparatus, an optical plate is formed on a polarizing plate transmitting polarized light of incident light, and includes a phase delaying layer having first and second patterns. The first pattern delays a phase of the polarized light by $3\lambda/4$ and the second pattern delays the phase of the polarized light by $\lambda/4$. Accordingly, a process of manufacturing the display apparatus may be simplified, and a thickness of the display apparatus may be decreased.

20 Claims, 11 Drawing Sheets

OPTICAL PLATE, METHOD OF MANUFACTURING THE OPTICAL PLATE, DISPLAY APPARATUS, AND METHOD OF MANUFACTURING THE DISPLAY APPARATUS

CROSS REFERENCE TO RELATED APPLICATION

This application claims priority from and the benefit of Korean Patent Application No. 2010-0070820, filed on Jul. 22, 2010, which is hereby incorporated by reference for all purposes as if fully set forth herein.

BACKGROUND OF THE INVENTION

Field of the Invention

Exemplary embodiments of the present invention relate to an optical plate, a method of manufacturing the optical plate, a display apparatus and a method of manufacturing the display apparatus. More specifically, exemplary embodiments of the present invention relate to an optical plate displaying a 3-dimensional image through polarizing spectacles used for a is display apparatus, a method of manufacturing the optical plate, a display apparatus and a method of manufacturing the display apparatus.

DISCUSSION OF THE BACKGROUND

Generally, a liquid crystal display apparatus includes an array substrate in which switching elements for driving pixels are formed, an opposite substrate facing the array substrate, and a liquid crystal layer disposed between the array substrate and the opposite substrate. In a liquid crystal display panel, a voltage is applied to the liquid crystal layer and a light transmissivity is controlled to display a 2-dimensional plan image (hereinafter, referred to as a 2D image).

Recently, according to increasing demands for the 3-dimensional image (hereinafter, referred to as a 3D image) in fields of games, movies and so on, display apparatuses have been continuously developed for displaying the 3D image. An observer watches the 2D images differently from each other through a left eye and a right eye respectively, and the observer's brain mixes the 2D images, so that the 3D image may be perceived. The display apparatus for displaying the 3D image may be divided into a stereoscopic type and an autostereoscopic type according to whether specific spectacles are necessary.

In the stereoscopic type display apparatus, the specific spectacles, such as polarizing spectacles or liquid crystal shutter spectacles, may be used. The display apparatus having the liquid crystal shutter spectacles displays the 3D image by itself. Thus, the display apparatus having the liquid crystal shutter spectacles may be easily applied to a large-sized display apparatus, but since the liquid crystal shutter spectacles are expensive and an image display is delayed, display quality may be decreased.

However, in the display apparatus having the polarizing spectacles, an optical plate emitting polarized light having different directions is disposed on the display panel which displays the 2D image, and the polarized light having the different directions respectively reaches the left and right eyes of the observer wearing the specialized spectacles. Thus, the observer perceives the 3D image. Since the polarizing spectacles may be manufactured with a lower cost than the liquid crystal shutter spectacles and the display quality is relatively good, the display apparatus having the polarizing spectacles may be easily commercialized. However, since the optical plate should be attached on the display panel to display the 3D image instead of displaying the 3D image using the display apparatus itself, the optical plate should be attached on the display panel without misalignment.

In addition, the optical plate generally includes an alignment film having different directions according to areas of a base substrate or a base film, and liquid crystals disposed on the alignment film. Various processes such as coating, exposing, aligning and so on may be necessary to manufacture the optical plate, and thus time and/or costs for manufacturing processes may be increased. Furthermore, the optical plate is combined with the display panel having the polarizing plates attached to both surfaces of the display panel, and thus a thickness of the display apparatus may be increased.

SUMMARY OF THE INVENTION

Exemplary embodiments of the present invention provide an optical plate capable of simplifying a manufacturing process and decreasing a thickness of a display apparatus.

Exemplary embodiments of the present invention also provide a method of manufacturing the optical plate capable of simplifying the manufacturing process to enhance productivity.

Exemplary embodiments of the present invention also provide a display apparatus capable of enhancing an alignment reliability.

Exemplary embodiments of the present invention also provide a method of manufacturing the display apparatus.

Additional features of the invention will be set forth in the description which follows, and in part will be apparent from the description, or may be learned by practice of the invention.

An exemplary embodiment of the present invention discloses an optical plate including a polarizing plate and a phase delaying layer. The polarizing plate transmits polarized light of incident light. The phase delaying layer is disposed on the polarizing plate, and includes first and second patterns. The first pattern delays a phase of the polarized light by $3\lambda/4$, and the second pattern delays the phase of the polarized light by $\lambda/4$.

An exemplary embodiment of the present invention also discloses a method of manufacturing an optical plate, including forming a phase delaying film on a polarizing plate to delay a phase of polarized light that is emitted by the polarizing plate, which transmits the polarized light of incident light. Forming a phase delaying layer including forming a first pattern and a second pattern. The first pattern delays the phase of the polarized light by $3\lambda/4$, and the second pattern delays the phase of the polarized light by $\lambda/4$.

An exemplary embodiment of the present invention also discloses a display apparatus including a polarizing plate, a display panel and an optical plate. The polarizing plate transmits a first polarized light of incident light. The display panel is disposed on the polarizing plate. The optical plate is disposed on the display panel and includes a polarizing layer and a phase delaying layer. The polarizing layer transmits a second polarized light of light passing through the display panel. The phase delaying layer includes a first pattern and a second pattern disposed on the polarizing layer. The first pattern delays a phase of the second polarized light by $3\lambda/4$, and the second pattern delays the phase of the second polarized light by $\lambda/4$.

An exemplary embodiment of the present invention also discloses a method of manufacturing a display apparatus that includes a display panel. A polarizing layer to transmit polarized light of incident light is formed on the display panel. A phase delaying film to delay a phase of the polarized light is formed on the polarizing layer. Forming a phase delaying layer including forming a first pattern and a second pattern. The first pattern delays the phase of the polarized light delayed by the phase delaying film by $3\lambda/4$. The second pattern delays the phase of the polarized light by $\lambda/4$.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
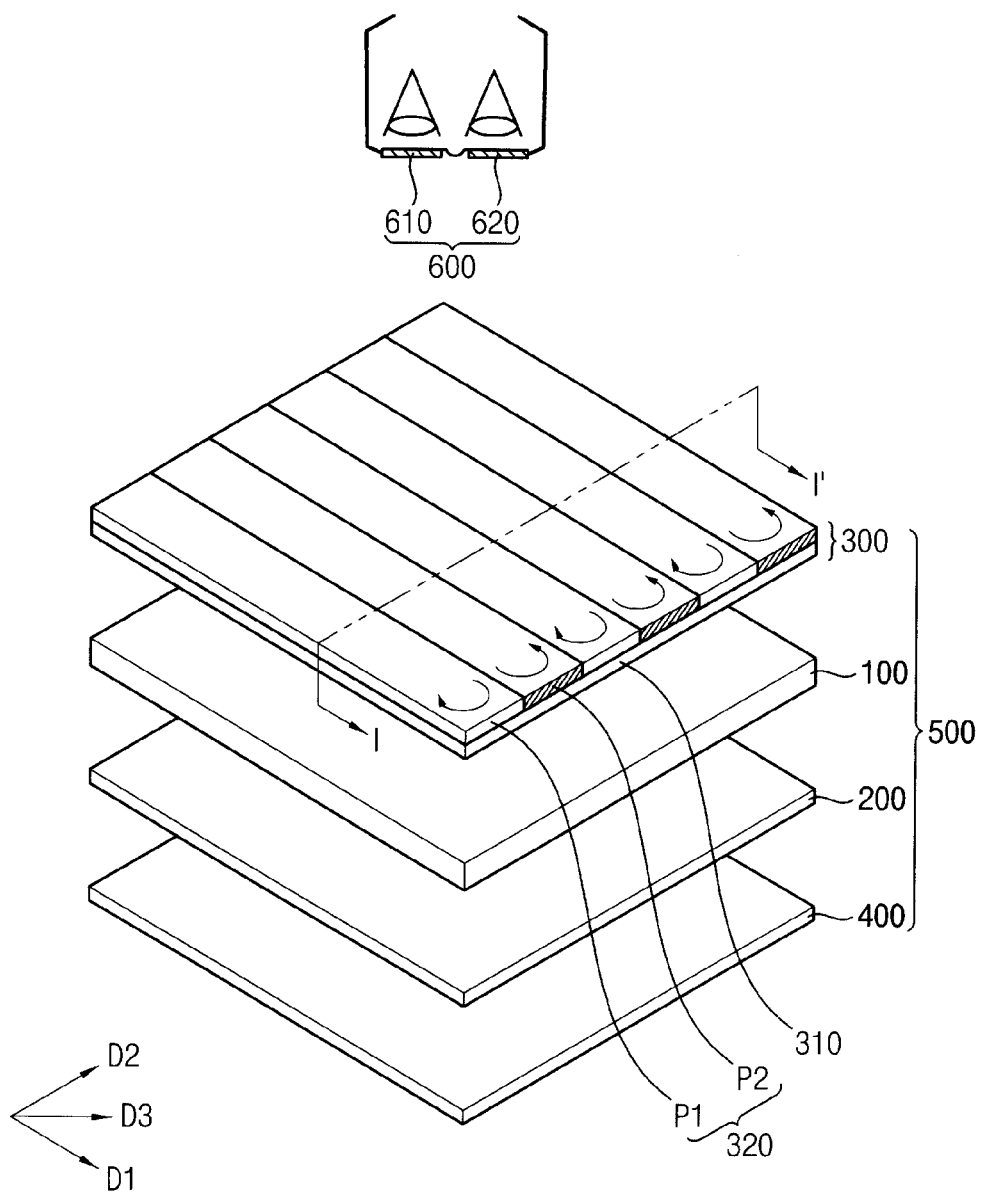
FIG. 1 is a conceptual perspective view explaining a display apparatus according to an exemplary embodiment of the present invention.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present.

Figure 2:
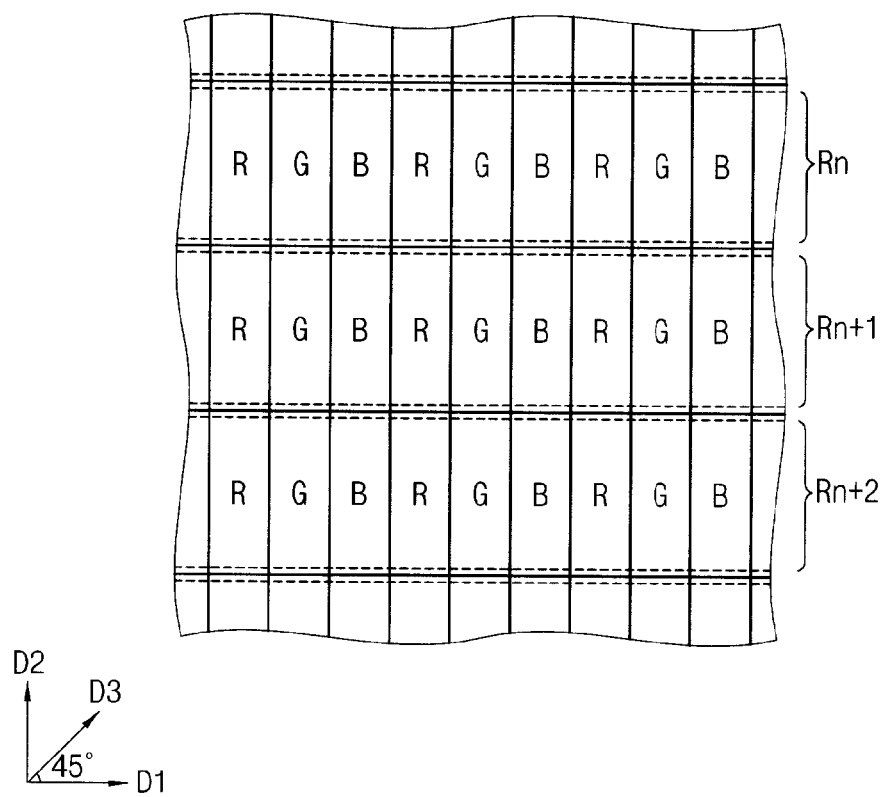
FIG. 2 is an enlarged plan view illustrating an arrangement between a display panel and a phase delaying layer in FIG. 1.
Figure 3:
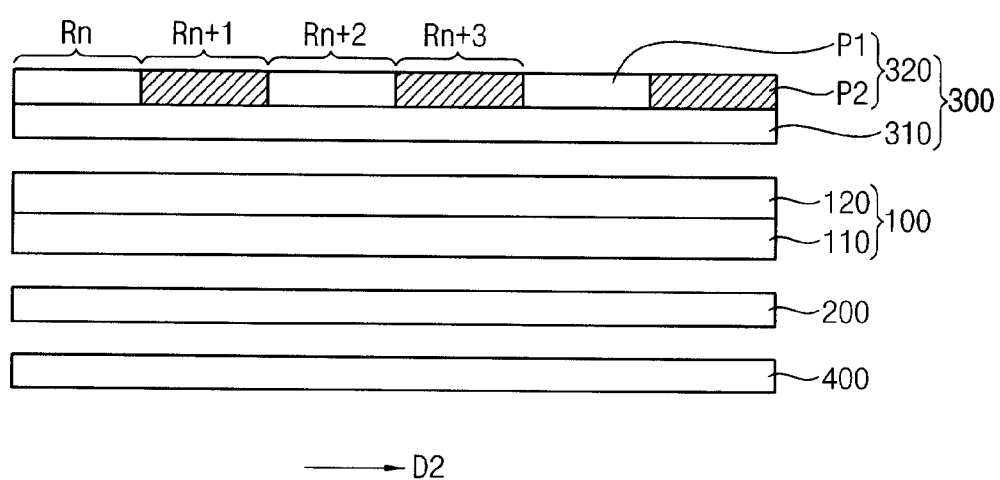
FIG. 3 is a cross-sectional view taken along line I-I' of FIG. 1.
Figure 5A:
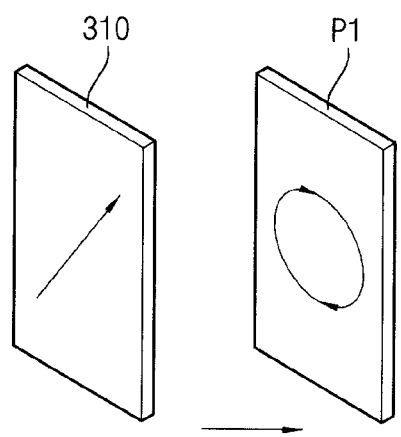
FIG. 5A and FIG. 5B are conceptual diagrams explaining light passing through an optical plate in FIG. 3.
Figure 5B:
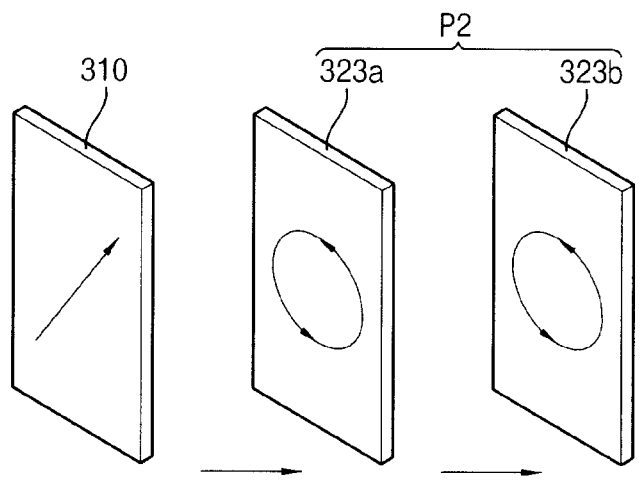

A display apparatus including an optical plate is explained referring to FIG. 1, FIG. 2 and FIG. 3, and the optical plate is specifically explained referring to FIG. 5A, FIG. 5B and FIG. 5C according to an exemplary embodiment of the present invention.

FIG. 1 is a conceptual perspective view explaining a display apparatus according to an exemplary embodiment of the present invention.

Referring to FIG. 1, the display apparatus 500 according the present exemplary embodiment includes a display panel 100, a polarizing plate 200, an optical plate 300 and a backlight assembly 400.

The display panel 100 displays an image using light provided from the backlight assembly 400. For example, the display panel 100 may be a liquid crystal display panel including a liquid crystal. The display panel 100 may be disposed over the backlight assembly 400.

The polarizing plate 200 is disposed between the display panel 100 and the backlight assembly 400. The polarizing plate 200 polarizes incident light provided from the backlight assembly 400 to provide the display panel 100 with the light. The polarizing plate 200 transmits a first polarized light of the incident light.

The optical plate 300 is disposed on the display panel 100. The optical plate 300 includes a polarizing layer 310 and a phase delaying layer 320. The polarizing layer 310 transmits a second polarized light of light passing through the display panel 100. A polarization direction of the second polarized light is different from that of the first polarized light. For example, the polarization direction of the second polarized light may be perpendicular to that of the first polarized light. Although the optical plate 300 and the display panel 100 are illustrated in FIG. 1 as separated from each other, the optical plate 300 may be directly attached to the display panel 100, or may be directly formed on the display panel 100.

The polarizing layer 310 may be a constituent of the optical plate 300 and may be defined as "a layer". Alternatively, the polarizing layer 310 may be an independent constituent of the display panel 100 and may be defined as "a plate". In the present exemplary embodiment, "a polarizing layer" is substantially the same as the polarizing plate 200 having a latticed line pattern and formed on a base substrate. The polarizing layer is defined and used to distinguish from the polarizing plate 200.

The phase delaying layer 320 is disposed on the polarizing layer 310 and delays a phase of the second polarized light passing through the polarizing layer 310. The phase delaying layer 320 includes a first pattern P1 delaying a phase of the second polarized light by $3\lambda/4$, and a second pattern P2 delaying the phase of the second polarized light by $\lambda/4$. In this case, "$\lambda$" is a wavelength of light. For example, the wavelength may be between about 500 nm to about 550 nm that may be a wavelength of green light.

The first pattern P1 and the second pattern P2 extend along a first direction D1 of the display apparatus 500, and are repetitively arranged along a second direction D2. The second direction D2 may be substantially perpendicular to the first direction D1. For example, the first and second patterns P1 and P2 are arranged as a latticed line. The first pattern P1 delays the phase of the second polarized light to transform the second polarized light to a first circular polarized light. The first pattern P1 may transform the second polarized light to the first circular polarized light in a similar manner as rotating the second polarized light by −45 degrees using a rotator. The second pattern P2 delays the phase of the second polarized light to transform the second polarized light to a second circular polarized light different from the first pattern P1. The second pattern P2 may transform the second polarized light to the second circular polarized light in a similar manner as rotating the second polarized light by +45 degrees using the rotator. Polarization directions of the first and second circular polarized lights are opposite to each other. For example, the first circular polarized light may be a left circular polarized light, and the second circular polarized light may be a right circular polarized light. Alternatively, the first circular polarized light may be a right circular polarized light, and the second circular polarized light may be a left circular polarized light.

The display apparatus 500 displays a 2-dimensional (2D) image, but an observer wearing polarizing spectacles 600 may receive the first circular polarized light to one eye and the second circular polarized light to the other eye respectively through the polarizing spectacles 600. The polarizing spectacles 600 include a first spectacle part 610 passing the first circular polarized light and a second spectacle part 620 passing the second circular polarized light. The first circular polarized light may pass through the first spectacle part 610, but may not pass through the second spectacle part 620. The second circular polarized light may pass through the second spectacle part 620, but may not pass through the first spectacle part 610. Thus, the observer watches the first circular polarized light only through the first eye, and the second circular polarized light only through the second eye, and a brain of the observer perceives substantially a stereoscopic image, which means a 3-dimensional (3D) image. However, the brain of the observer may perceive a plan image, which means the 2D image, without wearing the polarizing spectacles 600.

FIG. 2 is an enlarged plan view illustrating an arrangement between a display panel 100 and a phase delaying layer 320 in FIG. 1. FIG. 3 is a cross-sectional view taken along line I-I' of FIG. 1.

Referring to FIG. 2 and FIG. 3, the display panel 100 includes a first substrate 110 having a thin-film transistor (TFT, not shown) and a pixel electrode (not shown), and a second substrate 120 facing the first substrate 110. A display element is disposed between the first substrate 110 and the second substrate 120 to control a transmissivity of light provided from the backlight assembly 400, and the display panel 100 may display an image. The display element may be, for example, a liquid crystal. The polarizing plate 200 is combined with a light incident surface of the display panel 100 receiving light from the backlight assembly 400. The optical plate 300 is combined with a light exiting surface facing the light incident surface. For example, the polarizing plate 200 is combined with an external face of the first substrate 110 that is the light incident surface, and the optical plate 300 is combined with an external face of the second substrate 120 that is the light exiting surface. The polarizing layer 310 and the phase delaying layer 320 may be sequentially formed on the external surface of the second substrate 120.

The display panel 100 includes a plurality of pixel cells defined by combining the first substrate 110 and the second substrate 120. Each of the pixel cells includes a pixel electrode and a color filter displaying a color. The color filter may be formed on the first substrate 110, or formed on the second substrate 120. The pixel cells may include a red (R) pixel, a green (G) pixel and a blue (B) pixel respectively emitting red light, green light and blue light. The R, G and B pixels are repetitively arranged along the first direction D1 to define an n-th pixel line Rn. R, G and B pixels respectively arranged along the second direction D2 of the R, G and B pixels define an (n+1)-th pixel line Rn+1 arranged along the second direction D2 from the n-th pixel line Rn. An (n+2)-th pixel line Rn+2 is arranged along the second direction D2 from the (n+1)-th pixel line Rn+1.

A plurality of first patterns P1 extends along the first direction D1 and the first patterns P1 are spaced apart from each other along the second direction D2, and thus the first patterns P1 are disposed on the n-th and (n+2)-th pixel lines Rn and Rn+2. The second pattern P2 is disposed between the adjacent first patterns P1, and thus the second pattern P2 is disposed on the (n+1)-th pixel line Rn+1.

A phase delaying axis of the phase delaying layer 320 has an inclination with respect to a polarized light absorbing axis of the polarizing layer 310. For example, when the phase delaying axis extends along the first direction D1 or the second direction D2, the polarized light absorbing axis may extend along a third direction D3 between the first direction D1 and the second direction D2. For example, the phase delaying axis has an inclination of 45 degrees with respect to the polarized light absorbing axis, so that the phase delaying layer circularly polarizes the second polarized light.

Figure 4:
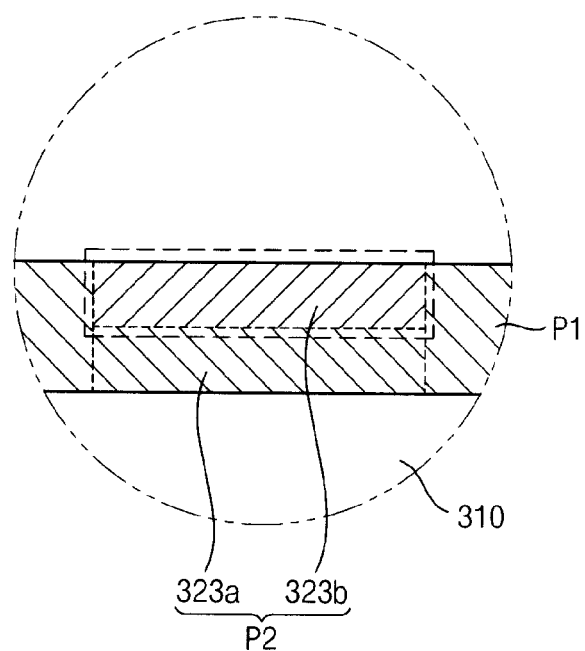
FIG. 4 is an enlarged sectional view illustrating a second pattern in FIG. 3.

FIG. 4 is an enlarged sectional view illustrating the second pattern P2 in FIG. 3.

Referring to FIG. 4, the second pattern P2 may include a phase delaying portion 323a and an isotropic optical portion 323b. The phase delaying portion 323a is optically anisotropic. The isotropic optical portion 323b is isotropic and disposed on the phase delaying portion 323a. The phase delaying portion 323a delays the phase of the second polarized light by substantially $\lambda/4$. To form the second pattern P2, the first pattern P1 is partially transformed to the isotropic optical portion 323b, and a portion of the first pattern P1 which is not transformed to the isotropic optical portion 323b remains as the phase delaying portion 323a. The isotropic optical portion 323b transmits light passing through the phase delaying portion 323a without changing optical characteristics of the light.

FIG. 5A and FIG. 5B are conceptual diagrams explaining light passing through the exemplary embodiment of an optical plate 300 shown in FIG. 3.

Referring to FIG. 5A, light passing through the n-th and (n+2)-th pixel lines Rn and Rn+2 of the display panel 100 passes through the polarizing layer 310 to become the second polarized light. Then, the second polarized light passes through the first pattern P1 of the phase delaying layer 320 and the phase of the second polarized light is delayed by $3\lambda/4$, so that the second polarized light may become the first circular polarized light. The first pattern P1 according to the present example embodiment is formed as a single layer delaying the phase of the second polarized light by $3\lambda/4$.

Referring to FIG. 5B, light passing through the (n+1)-th pixel line Rn+1 of the display panel 100 passes through the polarizing layer 310 to become the second polarized light. The second polarized light passes through the phase delaying portion 323a of the second pattern P2 and the phase of the second polarized light is delayed by $\lambda/4$, so that the second polarized light may become the second circular polarized light. Then, since the isotropic optical portion 323b has no optical effect on the second circular polarized light, the second circular polarized light passes through the isotropic optical portion 323b.

Although not shown in the figures, the phase delaying layer 320 includes a third pattern delaying the phase of the second polarized light by $3\lambda/4$ and a fourth pattern delaying the phase of the second polarized light by $\lambda/4$. The third and fourth patterns may be arranged as a checkerboard shape. When the R, G and B pixels are regarded as a single unit, each of the third pattern and the fourth pattern may be arranged as the checkerboard shape corresponding to at least one unit.

FIG. 6A, FIG. 6B, FIG. 6C and FIG. 6D are cross-sectional views explaining an exemplary embodiment of a method of manufacturing the optical plate 300 illustrated in FIG. 1.

Figure 6A:
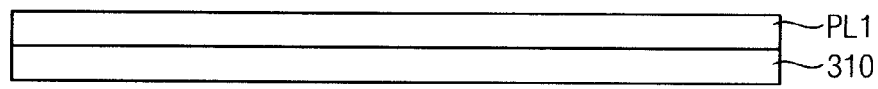
FIG. 6A, FIG. 6B, FIG. 6C, and FIG. 6D are cross-sectional views explaining an exemplary embodiment of a method of manufacturing the optical plate in FIG. 1.

Referring to FIG. 6A, a first phase delaying film PL1 is formed on the polarizing layer 310. The first phase delaying film PL1 is a phase delaying film delaying the phase of the second polarized light passing through the polarizing layer 310 by $3\lambda/4$. A phase delaying axis of the first phase delaying film PL1 is formed on the polarizing layer 310, and has an inclination of 45 degrees with respect to the polarized light absorbing axis of the polarizing layer 310.

Figure 6B:
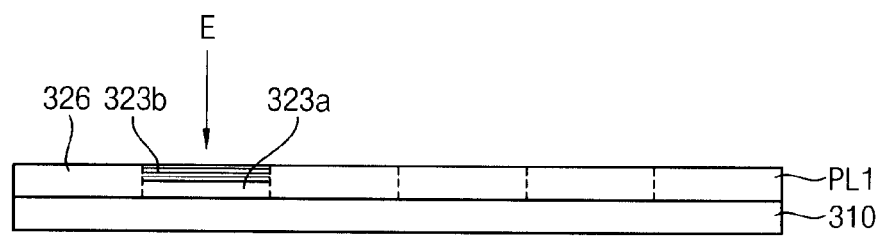

Referring to FIG. 6B, heat E is applied to a first portion 324 of the first phase delaying film PL1. A heat-transfer printer may be used for applying the heat E. The heat-transfer printer applies the heat E, and thus the first phase delaying film PL1 is locally and partially heated to form the isotropic optical portion 323b.

The first phase delaying film PL1 is locally and partially transformed to the isotropic optical portion 323b, and thus a second portion 326 of the first phase delaying film PL1 adjacent to the first portion 324 may be defined as the first pattern P1. In addition, the isotropic optical portion 323b is formed of the first portion 324, and thus a portion of the first phase delaying film PL1 under the isotropic optical portion 323b remains optically anisotropic, to be the phase delaying portion 323a.

Figure 6C:
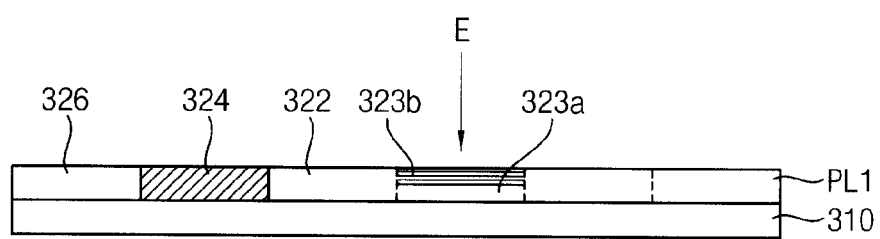

Referring to FIG. 6C, the heat E is applied to a third portion of the first phase delaying film PL1 spaced apart from the first portion 324. Thus, the isotropic optical portion 323b is formed on the third portion. A portion of the first phase delaying film PL1 under the isotropic optical portion 323b remains optically anisotropic, to be the phase delaying portion 323a.

Figure 6D:
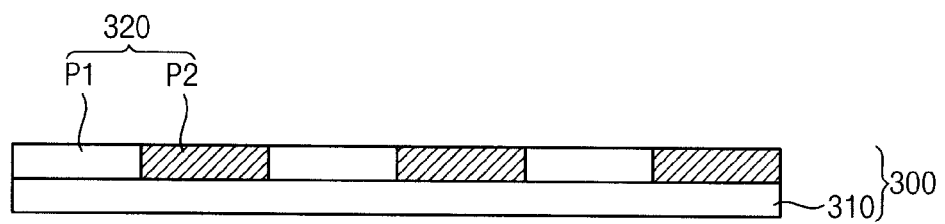

Referring to FIG. 6D, the processes mentioned above are repeatedly performed, so that the phase delaying layer 320 including the first pattern P1 and the second pattern P2 may be formed from the first phase delaying film PL1. Accordingly, the optical plate 300 is completed.

Although not shown in the figures, the processes in FIG. 6A, FIG. 6B, and FIG. 6C may be performed with a single step using the heat-transfer printer heating a plurality of portions of the first phase delaying film PL1 at the same time.

Referring to the present exemplary embodiment, the phase delaying layer 320 that transmits the light delayed by the phases different from each other through a light exiting surface may be easily formed via a simple process. Accordingly, a productivity of the optical plate 300 may be enhanced.

Referring to FIG. 3, the display panel 100 having the first substrate 110 and the second substrate 120 is formed. After the polarizing plate 200 is combined with the external surface of the first substrate 110 of the display panel 100, the optical plate 300 illustrated in FIG. 6D may be combined with the display panel 100. Accordingly, a thickness of the display apparatus 500 may be decreased and the process of manufacturing the display apparatus 500 may be simplified using the optical plate 300.

Figure 7:
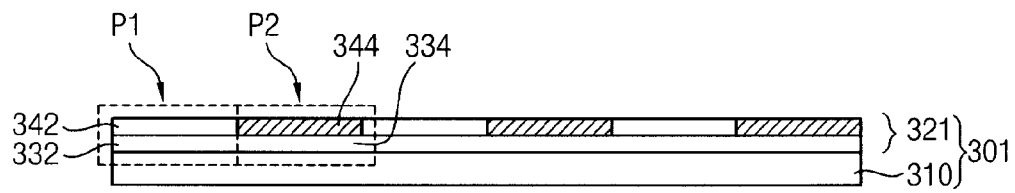
FIG. 7 is a cross-sectional view illustrating an optical plate according to another exemplary embodiment of the present invention.

FIG. 7 is a cross-sectional view illustrating an optical plate according to another exemplary embodiment of the present invention.

Referring to FIG. 7, the optical plate 301 according to the present exemplary embodiment includes the polarizing layer 310 and a phase delaying layer 321 formed on the polarizing layer 310. The phase delaying layer 321 delays a phase of polarized light passing through the polarizing layer 310, so that the polarized light is changed to first circular polarized light and second circular polarized light.

The phase delaying layer 321 includes the first pattern P1 delaying a phase of the polarized light by $3\lambda/4$, and the second pattern P2 delaying the phase of the polarized light by $\lambda/4$. For example, the first pattern P1 includes a first optical layer 332 and a second optical layer 342 formed on the first optical layer 332. A phase delaying axis of the first optical layer 332 may be substantially the same as that of the second optical layer 342. The first optical layer 332 delays the phase of the light by $\lambda/4$. The second optical layer 342 delays the phase of the light passing through the first optical layer 332 by $\lambda/2$. The second pattern P2 includes an anisotropic optical layer 334 that is substantially the same as the first optical layer 332 and an isotropic optical layer 344 formed on the anisotropic optical layer 334. The anisotropic optical layer 334 delays the phase of the polarized light by $\lambda/4$. The isotropic optical layer 344 transmits the polarized light delayed by $\lambda/4$ without an optical change.

The first optical layer 332 and the anisotropic optical layer 334 are substantially the same layer that delays the phase of the polarized light by $\lambda/4$. A layer substantially the same as the second optical layer 342 is transformed by heat E, to be formed as the isotropic optical layer 344.

Figure 8A:
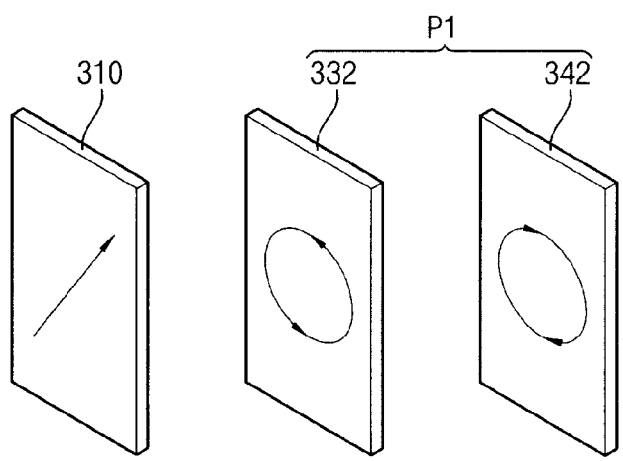
FIG. 8A and FIG. 8B are conceptual diagrams explaining light passing through the optical plate in FIG. 7.
Figure 8B:
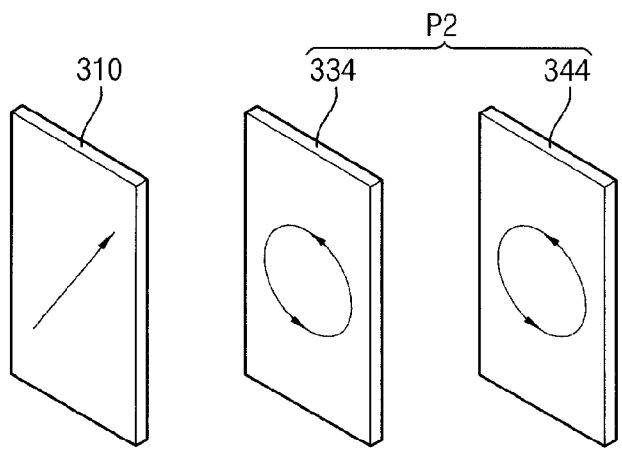

FIG. 8A and FIG. 8B are conceptual diagrams explaining the light passing through the exemplary embodiment of an optical plate 301 illustrated in FIG. 7.

Referring to FIG. 8A, incident light passes through the polarizing layer 310, and becomes the polarized light. The polarized light passes through the first optical layer 332 of the first pattern P1, and thus the phase of the polarized light is delayed by $\lambda/4$. The polarized light delayed by $\lambda/4$, may be substantially the same as the second circular polarized light. Then, the second circular polarized light passes through the second optical layer 342 of the first pattern P1, and thus the polarization direction of the second circular polarized light is changed to be the first circular polarized light. For example, the polarized light sequentially passes through the first optical layer 332 and the second optical layer 342 to become the first circular polarized light as the polarized light passes through a $3\lambda/4$ delaying plate.

Referring to FIG. 8B, the incident light passes through the polarizing layer 310, and becomes the polarized light. The polarized light passes through the anisotropic optical layer 334. Thus, the phase of the polarized light is delayed by λ/4 and becomes the second circular polarized light. Then, the second circular polarized light passes through the isotropic optical layer 344 without an optical change. Since the isotropic optical layer 344 has no optical effect on the second circular polarized light, the second circular polarized light passes through the isotropic optical layer 344.

Figure 9:
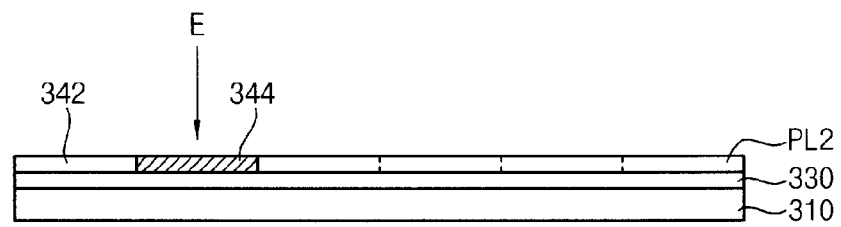
FIG. 9 is a cross-sectional view explaining an exemplary embodiment of a method of manufacturing the optical plate in FIG. 7.

FIG. 9 is a cross-sectional view explaining an exemplary embodiment of a method of manufacturing the optical plate 301 illustrated in FIG. 7.

Referring to FIG. 9, the polarizing layer 310 is formed. A process for forming the polarizing layer 310 is substantially the same as that described referring to FIG. 6A. Thus, any repetitive explanation concerning the above elements will be omitted.

An anisotropic optical film having a first optical film 330 and a second optical film PL2 is formed on the polarizing layer 310. The first optical film 330 is a phase delaying film delaying the phase of the polarized light passing through the polarizing layer 310 by λ/4. A phase delaying axis of the first optical film 330 is formed on the polarizing layer 310, and has an inclination of 45 degrees with respect to the polarized light absorbing axis of the polarizing layer 310. The second optical film PL2 is a phase delaying film delaying the phase of the second circular polarized light transmitted by the first optical film 330 by λ/2. A phase delaying axis of the second optical film PL2 is formed on the polarizing layer 310, and has an inclination of 45 degrees with respect to the polarized light absorbing axis of the polarizing layer 310. The phase delaying axis of the second optical film PL2 may be substantially the same as the phase delaying axis of the first optical film 330.

Heat E is applied to a first portion of the second optical film PL2. Thus, an optical characteristic of the second optical film PL2 is changed, and the isotropic optical layer 344 is formed. The first optical film 330 disposed under the second optical film PL2 is defined as the anisotropic optical layer 334. Then, the heat E is applied to a second portion of the second optical film PL2 spaced apart from the first portion, and thus the isotropic optical layer 344 is formed. The processes mentioned above are performed repeatedly, so that the optical plate 301 illustrated in FIG. 7 may be formed.

According to the present exemplary embodiment, the phase delaying layer transmitting the light delayed by the phases different from each other through the light exiting surface may be easily and simply formed via the processes using two optical films different from each other. Accordingly, a productivity of the optical plate 301 manufacturing may be enhanced. In addition, the display apparatus may be manufactured by combining the optical plate 301 with the display panel 100 illustrated in FIG. 1.

The display panel 100 illustrated in FIG. 3 is manufactured and the polarizing plate 200 is combined with the external surface of the first substrate 110 of the display panel 100, and then, the optical plate 301 illustrated in FIG. 7 may be combined with the display panel 100. Accordingly, a thickness of the display apparatus 500 may be decreased and the process of manufacturing the display apparatus 500 may be simplified using the optical plate 301.

Figure 10:
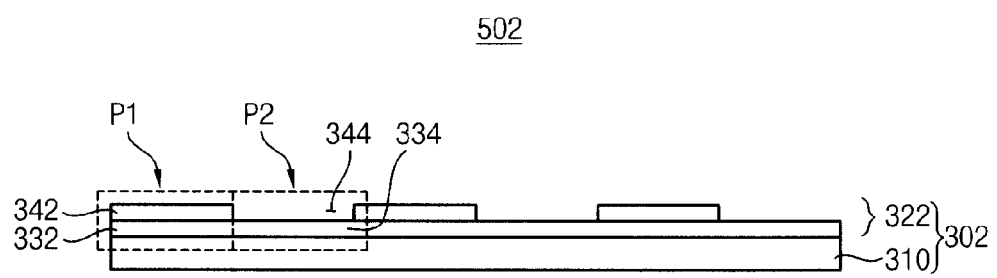
FIG. 10 is a cross-sectional view illustrating an optical plate according to still another exemplary embodiment of the present invention.

FIG. 10 is a cross-sectional view illustrating an optical plate according to still another exemplary embodiment of the present invention.

Referring to FIG. 10, an optical plate 302 according to the present exemplary embodiment includes the polarizing layer 310, and a phase delaying layer 322 formed on the polarizing layer 310. The phase delaying layer 322 delays a phase of a polarized light passing through the polarizing layer 310, so that the polarized light is changed to a first circular polarized light and a second circular polarized light.

The phase delaying layer 322 includes the first pattern P1 delaying the phase of the polarized light by 3λ/4 and the second pattern P2 delaying the phase of the polarized light by λ/4. For example, the first pattern P1 includes the first optical layer 332 and the second optical layer 342 formed on the first optical layer 332. The first pattern P1 is substantially the same as the first pattern described referring to FIG. 7. Thus, any repetitive explanation concerning the above elements will be omitted. The second pattern P2 includes only the anisotropic optical layer 334 that is substantially the same as the first optical layer 332. The anisotropic optical layer 334 delays the phase of the polarized light by λ/4. The first optical layer 332 and the anisotropic optical layer 334 are substantially the same as each other, both of which delay the phase of the polarized light by λ/4.

A process of transforming the polarized light into the first circular polarized light by the first pattern P1 is substantially the same as that described referring to FIG. 8A. Thus, any repetitive explanation concerning the above elements will be omitted.

Figure 11:
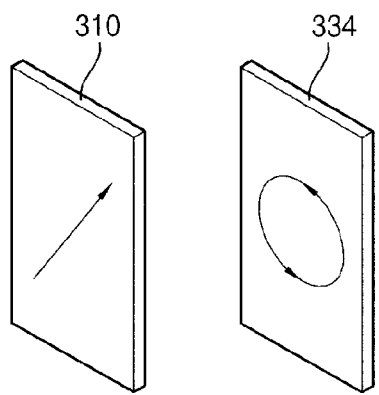
FIG. 11 is a conceptual diagram explaining light passing through the optical plate in FIG. 10.

FIG. 11 is a conceptual diagram explaining the light passing through the exemplary embodiment of an optical plate 302 illustrated in FIG. 10.

Referring to FIG. 11, incident light passes through the polarizing layer 310, and becomes the polarized light. The polarized light passes through the first pattern P1 and the phase of the polarized light is delayed by λ/4, and thus the polarized light becomes the second circular polarized light. Since the second pattern P2 includes only the anisotropic optical layer 334, the second circular polarized light passing through the anisotropic optical layer 334 is transferred to the observer without an optical change.

Figure 12:
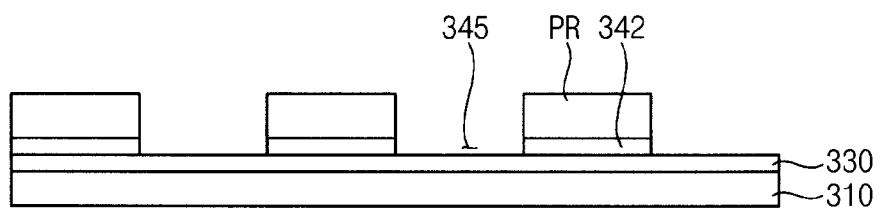
FIG. 12 is a cross-sectional view explaining an exemplary embodiment of a method of manufacturing the optical plate in FIG. 10.

FIG. 12 is a cross-sectional view explaining an exemplary embodiment of a method of manufacturing the optical plate 302 in FIG. 10.

Referring to FIG. 12, the polarizing layer 310 is formed. A process for forming the polarizing layer 310 is substantially the same as that described referring to FIG. 6A. Thus, any repetitive explanation concerning the above elements will be omitted.

A second phase delaying film having the first optical film 330 and the second optical film PL2 is formed on the polarizing layer 310. The first optical film 330 and the second optical film PL2 are substantially the same as those described in FIG. 9. Thus, any repetitive explanation concerning the above elements will be omitted.

A photoresist pattern PR is formed on the second optical film PL2. The second optical film PL2 is patterned using the photoresist pattern PR as a mask. A portion of the second optical film PL2 in which the photoresist pattern PR is not formed is removed to be a separated portion 345. In addition, the second optical film PL2 under the photoresist pattern PR remains to be the second optical layer 342.

According to the present exemplary embodiment, the phase delaying layer transmitting light delayed by the phases different from each other through the light exiting surface may be easily and simply formed by the processes using two optical films different from each other. Accordingly, the productivity of the optical plate 302 manufacturing may be enhanced. In addition, the display apparatus may be manufactured by combining the optical plate 302 with the display panel 100 illustrated in FIG. 1.

The display panel 100 illustrated in FIG. 3 is manufactured and the polarizing plate 200 is combined with the external surface of the first substrate 110 of the display panel 100, and then the optical plate 302 illustrated in FIG. 10 may be combined with the display panel 100. Accordingly, a thickness of the display apparatus 502 may be decreased and the process of manufacturing the display apparatus may be simplified using the optical plate 302.

Hereinafter, another exemplary embodiment of a method of manufacturing the optical plate 302 illustrated in FIG. 10 is explained referring to FIG. 13.

Figure 13:
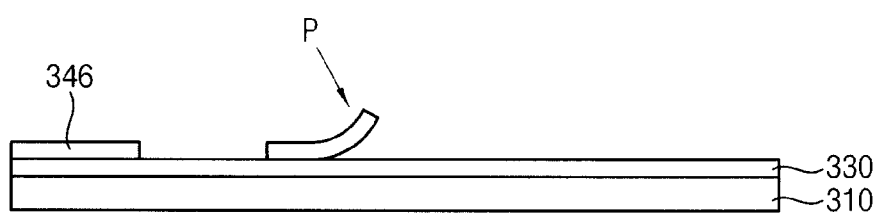
FIG. 13 is a cross-sectional view explaining a method of manufacturing an optical plate according to another exemplary embodiment of the present invention.

FIG. 13 is a cross-sectional view explaining the method of manufacturing an optical plate according to still another exemplary embodiment of the present invention. The optical plate 302 according to the present exemplary embodiment is substantially the same as the optical plate 302 illustrated in FIG. 10. Thus, any repetitive explanation concerning the above elements will be omitted.

Referring to FIG. 13, the polarizing layer 310 is formed, and a third phase delaying film having the first optical film 330 is formed on the polarizing layer 310. The polarizing layer 310 and the first optical film 330 are substantially the same as those described referring to FIG. 9. Thus, any repetitive explanation concerning the above elements will be omitted.

An anisotropic optical pattern 346 delaying a phase of light passing through the first optical film 330 by $\lambda/2$ and spaced apart from each other is formed on the first optical film 330. An external pressure P is applied to the anisotropic optical pattern 346, so that the anisotropic optical pattern 346 is attached on the first optical film 330. An adhesive may be disposed between the anisotropic optical pattern 346 and the first optical film 330.

According to the present exemplary embodiment, the phase delaying layer transmitting light delayed by the phases different from each other through the light exiting surface may be easily and simply formed by the processes using two optical films different from each other. Accordingly, the productivity of the optical plate 302 manufacturing may be enhanced.

A display apparatus accordingly to the present exemplary embodiment is substantially the same as the display apparatus 500 described referring to FIG. 2 and FIG. 3. Thus, any repetitive explanation concerning the above elements will be omitted. The display apparatus 500 according to the present exemplary embodiment is explained referring to FIG. 2 and FIG. 3. Referring to FIG. 2 and FIG. 3, the display apparatus 500 according to the present exemplary embodiment includes the display panel 100 having the first substrate 110 and the second substrate 120, the polarizing plate 200, the optical plate 300 and the backlight assembly 400.

Figure 14:
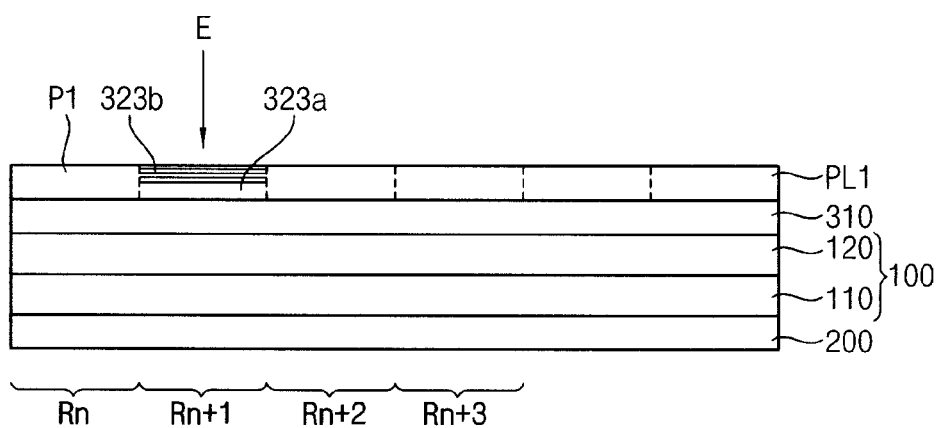
FIG. 14 and FIG. 15 are cross-sectional views explaining a method of manufacturing an optical plate according to still another exemplary embodiment of the present invention.
Figure 15:
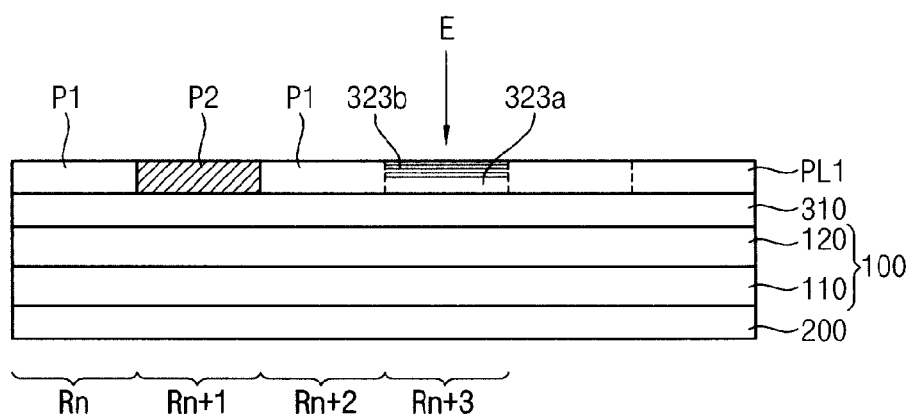

FIG. 14 and FIG. 15 are cross-sectional views explaining a method of manufacturing the optical plate according to still another exemplary embodiment of the present invention.

Referring to FIG. 2 and FIG. 14, the display panel 100 having the first substrate 110 and the second substrate 120 is formed, and the polarizing plate 200 is combined with the external surface of the first substrate 110 of the display panel 100. Then, the polarizing layer 310 is formed on the external surface of the second substrate 120. The polarizing layer 310 is formed on the second substrate 120 using the second substrate 120 as a base substrate.

The first phase delaying film PL1 is formed on the polarizing layer 310. The first phase delaying film PL1 is the phase delaying film delaying the phase of the second polarized light passing through the polarizing layer 310 by $3\lambda/4$. The phase delaying axis of the first phase delaying film PL1 is formed on the polarizing layer 310, and has an inclination of 45 degrees with respect to the polarized light absorbing axis of the polarizing layer 310.

Heat E is applied to a portion of the first phase delaying film PL1 that corresponds to the (n+1)-th pixel line Rn+1. The heat-transfer printer may be used in the course of applying the heat E. The heat-transfer printer locally applies the heat E to the portion of the first phase delaying film PL1 corresponding to the (n+1)-th pixel line Rn+1, and thus the first phase delaying film PL1 is locally and partially heated to form the isotropic optical portion 323b.

The first phase delaying film PL1 corresponding to the (n+1)-th pixel line Rn+1 is locally and partially transformed to the isotropic optical portion 323b, and thus a portion of the first phase delaying film PL1 that corresponds to the n-th pixel line Rn may be defined as the first pattern P1. In addition, the isotropic optical portion 323b is formed on the portion of the first phase delaying film PL1 corresponding to the (n+1)-th pixel line Rn+1, and thus the portion of the first phase delaying film PL1 under the isotropic optical portion 323b remains optically anisotropic, to be the phase delaying portion 323a.

Referring to FIG. 15, the heat E is applied to a portion of the first phase delaying film PL1 that corresponds to an (n+3)-th pixel line Rn+3. The heat-transfer printer locally applies the heat E to the portion of the first phase delaying film PL1 corresponding to the (n+3)-th pixel line Rn+3, and thus the first phase delaying film PL1 is locally and partially heated to form the isotropic optical portion 323b. The first phase delaying film PL1 corresponding to the (n+3)-th pixel line Rn+3 is locally and partially transformed to the isotropic optical portion 323b, and thus a portion of the first phase delaying film PL1 that corresponds to the (n+2)-th pixel line Rn+2 may be defined as the first pattern P1. In addition, the isotropic optical portion 323b is formed on the portion of the first phase delaying film PL1 corresponding to the (n+3)-th pixel line Rn+3, and thus the portion of the first phase delaying film PL1 under the isotropic optical portion 323b corresponding to the (n+3)-th pixel line Rn+3 remains optically anisotropic, to be the phase delaying portion 323a.

The processes mentioned above are performed, so that the phase delaying layer 320 may be formed from the first phase delaying film PL1. Accordingly, the optical plate 300 may be formed on the second substrate 120. Although not shown in the figures, the processes in FIG. 14 and FIG. 15 may be performed with a single step using the heat-transfer printer heating the (n+1)-th and (n+3)-th pixel lines Rn+1 and Rn+3 at the same time.

According to the present exemplary embodiment, the optical plate 300 having the phase delaying layer 320 that is integrally formed with the polarizing layer 310 is directly formed on the display panel 100, and thus a reliability of an alignment between the display panel 100 and the optical plate 300 may be enhanced. In addition, a thickness of the display apparatus 500 may be decreased and the process of manufacturing the display apparatus 500 may be simplified using the optical plate 300.

Figure 16:
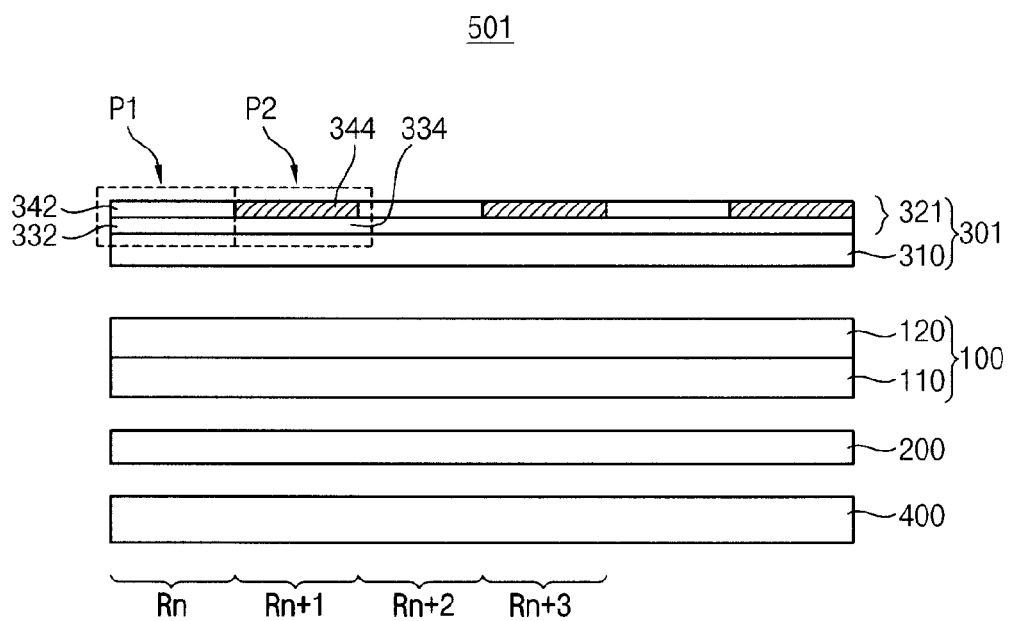
FIG. 16 is a cross-sectional view explaining a display apparatus according to still another exemplary embodiment of the present invention.

FIG. 16 is a cross-sectional view explaining a display apparatus according to still another exemplary embodiment of the present invention.

Referring to FIG. 16, the display apparatus 501 according to the present exemplary embodiment includes the display panel 100 having the first substrate 110 and the second substrate 120, the polarizing plate 200, the optical plate 301 and the backlight assembly 400. The display apparatus 501 illustrated in FIG. 16 is substantially the same as the display apparatus 500 illustrated in FIG. 2 and FIG. 3 except for the optical plate 301. In addition, the optical plate 301 according to the present exemplary embodiment is substantially the same as the optical plate 301 illustrated in FIG. 7 except that the optical plate 301 is directly formed on the second substrate 120. Thus, any repetitive explanation concerning the above elements will be omitted.

The optical plate 301 includes the polarizing layer 310 formed on the second substrate 120 of the display panel 100 and the phase delaying layer 321 formed on the polarizing layer 310. The phase delaying layer 321 includes the first pattern P1 delaying the phase of the second polarized light by $3\lambda/4$ and the second pattern P2 delaying the phase of the second polarized light by $\lambda/4$. The first pattern P1 is formed on the n-th and (n+2)-th pixel lines Rn and Rn+2, and the second pattern P2 is formed on the (n+1)-th and (n+3)-th pixel lines Rn+1 and Rn+3.

Figure 17:
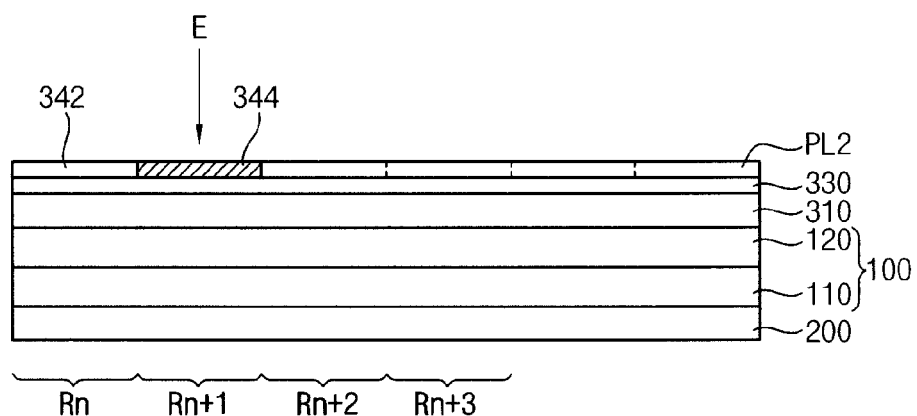
FIG. 17 is a cross-sectional view explaining an exemplary embodiment of a method of manufacturing the display apparatus in FIG. 16.

FIG. 17 is a cross-sectional view explaining a method of manufacturing the display apparatus in FIG. 16.

Referring to FIG. 17, the display panel 100 having the first substrate 110 and the second substrate 120 is manufactured, and the polarizing plate 200 is combined with the external surface of the first substrate 110 of the display panel 100. Then, the polarizing layer 310 is formed on the second substrate 120 using the second substrate 120 as the base substrate.

The second anisotropic optical film having the first optical film 330 and the second optical film PL2 is formed on the polarizing layer 310. The second optical film PL2 is substantially the same as that explained referring to FIG. 9. Thus, any repetitive explanation concerning the above elements will be omitted.

The heat E is applied to a portion of the second phase delaying film PL2 that corresponds to the (n+1)-th pixel line Rn+1. Accordingly, the second phase delaying film PL2 corresponding to the (n+1)-th pixel line Rn+1 is locally and partially transformed to the isotropic optical layer 344. The isotropic optical layer 344 is formed on the portion of the second phase delaying film PL2 corresponding to the (n+1)-th pixel line Rn+1, and thus a portion of the second phase delaying film PL2 that corresponds to the n-th pixel line Rn may be defined as the second optical layer 342. Then, the heat E is applied to a portion of the second phase delaying film PL2 that corresponds to the (n+3)-th pixel line Rn+3. The processes mentioned above are performed, so that the phase delaying layer 321 may be formed from the first optical film 330 and the second optical film PL2. Accordingly, the optical plate 301 may be formed on the second substrate 120.

According to the present exemplary embodiment, the optical plate 301 having the phase delaying layer 321 that is integrally formed with the polarizing layer 310 is directly formed on the display panel 100, and thus a reliability of an alignment between the display panel 100 and the optical plate 301 may be enhanced. In addition, a thickness of the display apparatus 501 may be decreased and the process of manufacturing the display apparatus 501 may be simplified using the optical plate 301.

Figure 18:
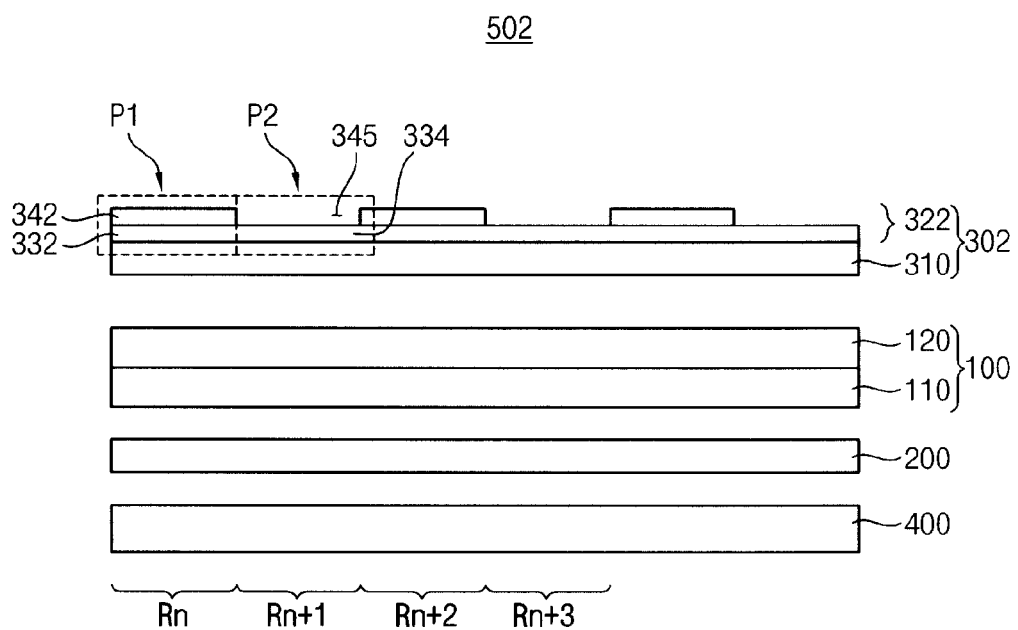
FIG. 18 is a cross-sectional view explaining a display apparatus according to still another exemplary embodiment of the present invention.

FIG. 18 is a cross-sectional view explaining a display apparatus according to still another exemplary embodiment of the present invention.

Referring to FIG. 18, the display apparatus 502 according to the present exemplary embodiment includes the display panel 100 having the first substrate 110 and the second substrate 120, the polarizing plate 200, the optical plate 302 and the backlight assembly 400. The display apparatus 502 illustrated in FIG. 18 is substantially the same as the display apparatus 501 illustrated in FIG. 16 except for the optical plate 302. In addition, the optical plate 302 is substantially the same as the optical plate 302 illustrated in FIG. 10 except that the optical plate 302 is directly formed on the second substrate 120. Thus, any repetitive explanation concerning the above elements will be omitted.

Figure 19:
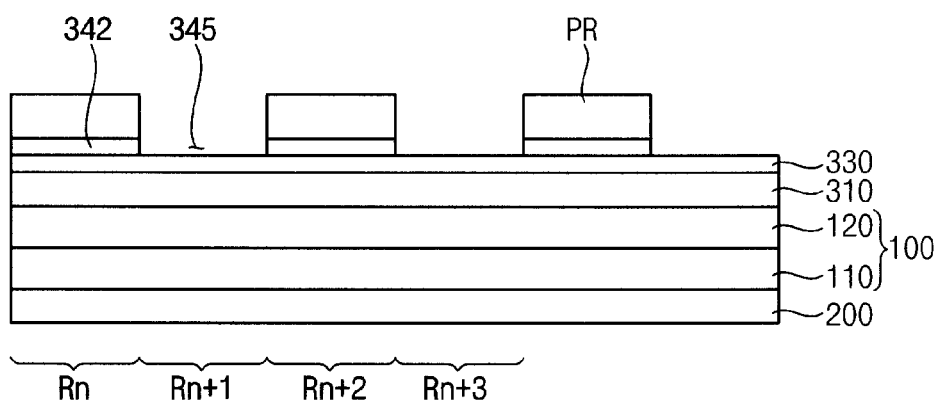
FIG. 19 is a cross-sectional view explaining an exemplary embodiment of a method of manufacturing the display apparatus in FIG. 18.

FIG. 19 is a cross-sectional view explaining a method of manufacturing the display apparatus in FIG. 18.

Referring to FIG. 19, the display panel 100 having the first substrate 110 and the second substrate 120 is formed, and the polarizing plate 200 is combined with the external surface of the first substrate 110 of the display panel 100. Then, the polarizing layer 310 is formed on the external surface of the second substrate 120. The polarizing layer 310 is formed on the second substrate 120 using the second substrate 120 as a base substrate.

The second phase delaying film having the first optical film 330 and the second optical film PL2 is formed on the polarizing layer 310. The anisotropic optical film according to the present exemplary embodiment is substantially the same as that illustrated in FIG. 9. Thus, any repetitive explanation concerning the above elements will be omitted.

The photoresist pattern PR is formed on the second optical film PL2, and the second optical film PL2 is patterned using the photoresist pattern PR as a mask. A portion of the second optical film PL2 that corresponds to the (n+1)-th and (n+3)-th pixel lines Rn+1 and Rn+3 of the display panel 100 is removed to be a separated portion 345. A portion of the second optical film PL2 that corresponds to the n-th and (n+2)-th pixel lines Rn and Rn+2 remains to be the second optical layer 342.

According to the present exemplary embodiment, a reliability of an alignment between the display panel 100 and the optical plate 302 may be enhanced. The optical plate 302 may be easily and simply formed via the above-mentioned processes. In addition, a thickness of the display apparatus 502 may be decreased and the process of manufacturing the display apparatus 502 may be simplified using the optical plate 302.

Hereinafter, another exemplary method of manufacturing the display apparatus 502 illustrated in FIG. 18, which is different from the method explained in FIG. 19, is explained referring to FIG. 20.

Figure 20:
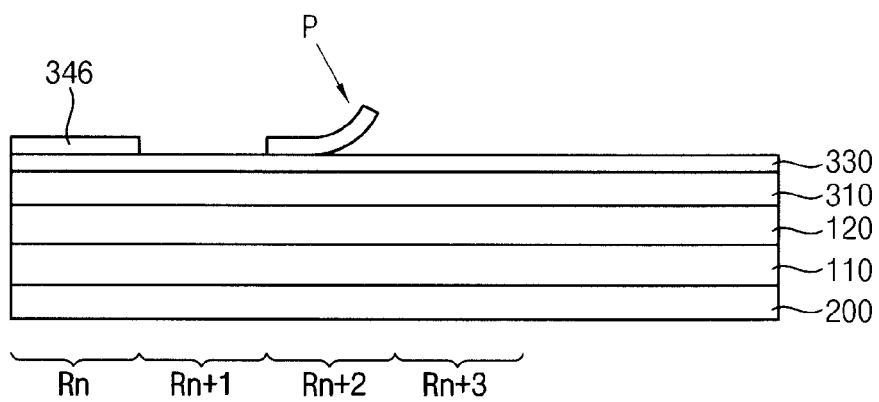
FIG. 20 is a cross-sectional view explaining a method of manufacturing a display apparatus according to still another exemplary embodiment of the present invention.

FIG. 20 is a cross-sectional view explaining a method of manufacturing the display apparatus according to still another exemplary embodiment of the present invention. A display apparatus according to the present exemplary embodiment referring to FIG. 18 is substantially the same as the display apparatus illustrated in FIG. 18. Thus, any repetitive explanation concerning the above elements will be omitted.

Referring to FIG. 20, the display panel 100 having the first substrate 110 and the second substrate 120 is manufactured, and the polarizing plate 200 is combined with the external surface of the first substrate 110 of the display panel 100. Then, the polarizing layer 310 is formed on the external surface of the second substrate 120. The polarizing layer 310 is formed on the second substrate 120 using the second substrate 120 as a base substrate. The third phase delaying film having the first optical film 330 is formed on the polarizing layer 310. The first optical film 330 according to the present example embodiment is substantially the same as that explained referring to FIG. 9. Thus, any repetitive explanation concerning the above elements will be omitted.

The anisotropic optical pattern 346 delaying the phase of the light passing through the first optical film 330 by $\lambda/2$ and spaced apart from each other is formed on the first optical film 330. The anisotropic optical pattern 346 may be formed only on portions of the display panel 100 corresponding to the n-th and (n+2)-th pixel lines Rn and Rn+2. A portion of the first optical film 330 corresponding to (n+1)-th and (n+3)-th pixel lines Rn+1 and Rn+3 is exposed by the anisotropic optical pattern 346. The external pressure P is applied to the anisotropic optical pattern 346 and thus the anisotropic optical pattern 346 is attached on the first optical film 330. The adhesive may be formed between the anisotropic optical pattern 346 and the first optical film 330.

The optical plate, the method of manufacturing the optical plate, the display apparatus, and the method of manufacturing the display apparatus according to the present invention may be applied to not only a liquid crystal display (LCD), but also a portable display apparatus, a plasma display panel (PDP), a flat display apparatus, a 3D game image apparatus, a 3D television for broadcasting, a 3D display for military affairs, a 3D display for simulated training and a 3D display for medical industries.

According to the exemplary embodiments of the present invention, the optical plate having the polarizing layer and the phase delaying layer may be used to increase a reliability of aligning the display panel with the optical plate. In addition, a thickness of the display apparatus may be decreased, and a process of the manufacturing of the display apparatus may be simplified.

While the present invention has been particularly shown and described with reference to exemplary embodiments thereof, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An optical plate, comprising:
a polarizing plate to transmit polarized light of incident light; and
a phase delaying layer disposed on the polarizing plate, wherein the phase delaying layer comprises a first pattern and a second pattern, the first pattern to delay a phase of the polarized light by a first amount, and the second pattern to delay the phase of the polarized light by a second amount with a difference between the first amount and the second amount being half the wavelength of the polarized light ($\lambda/2$), wherein the second pattern comprises a phase delaying portion and an isotropic optical portion disposed on the phase delaying portion.

2. The optical plate of claim 1, wherein
the first pattern is a single layer.

3. The optical plate of claim 1,
wherein the first pattern comprises a first optical layer to delay the phase of the polarized light by $\lambda/4$, and a second optical layer disposed on the first optical layer to delay the phase of the light passed through the first optical layer by $\lambda/2$,
wherein the second pattern comprises an anisotropic optical layer to delay the phase of the polarized light by $\lambda/4$ and being substantially the same as the first optical layer, and an isotropic optical layer disposed on the anisotropic optical layer to transmit the light passed through the anisotropic optical layer.

4. A method of manufacturing an optical plate, the method comprising:
forming a phase delaying film on a polarizing plate configured to transmit a polarized light of incident light, the phase delaying film to delay a phase of polarized light; and forming a phase delaying layer comprising a first pattern and a second pattern, the first pattern to delay the phase of the polarized light by $3\lambda/4$, and the second pattern to delay the phase of the polarized light by $\lambda/4$, wherein forming the phase delaying layer comprises forming the second pattern comprising an isotropic optical portion and an anisotropic optical portion.

5. The method of claim 4,
wherein an optical layer is partially transformed by heating the phase delaying film, which is a single layer that delays the polarized light by $3\lambda/4$, to form the isotropic optical portion, and
the phase delaying film under the isotropic optical portion remains untransformed to form the anisotropic optical portion that delays the phase of the polarized light by $\lambda/4$.

6. The method of claim 4, wherein forming the phase delaying film comprises:
forming a first optical film, the first optical film to delay the phase of the polarized light by $\lambda/4$; and
forming a second optical film on the first optical film, the second optical film to delay the phase of the polarized light passing through the first optical film by $\lambda/2$.

7. The method of claim 6, wherein forming the phase delaying layer comprises heating the second optical film to form an isotropic optical layer in a portion of the second optical film.

8. The method of claim 6, wherein forming the phase delaying layer comprises partially removing the second optical film to partially expose the first optical film.

9. A display apparatus, comprising:
a polarizing plate to transmit a first polarized light of incident light;
a display panel disposed on the polarizing plate; and
an optical plate disposed on the display panel and comprising a polarizing layer and a phase delaying layer, the polarizing layer to transmit a second polarized light of light passing through the display panel, the phase delaying layer disposed on the polarizing layer, wherein the phase delaying layer comprises a first pattern and a second pattern, the first pattern to delay a phase of the second polarized light by a first amount, and the second pattern to delay the phase of the second polarized light by a second amount with a difference between the first amount and the second amount being half the wavelength of the second polarized light ($\lambda/2$), wherein the second pattern comprises a phase delaying portion and an isotropic optical portion disposed on the phase delaying portion.

10. The display apparatus of claim 9, wherein a polarizing axis of the polarizing layer has an inclination of 45 degrees with respect to a phase delaying axis of the phase delaying layer.

11. The display apparatus of claim 9,
wherein the first pattern is a single layer.

12. The display apparatus of claim 9, wherein the first pattern comprises:
a first optical layer to delay the phase of the second polarized light by $\lambda/4$; and
a second optical layer disposed on the first optical layer, to delay a phase of light passed through the first optical layer by $\lambda/2$.

13. The display apparatus of claim 12, wherein the second pattern comprises:
an anisotropic optical layer to delay the phase of the second polarized light by $\lambda/4$, and being substantially the same as the first optical layer; and an isotropic optical layer disposed on the anisotropic optical layer, to transmit light passed through the anisotropic optical layer.

14. The display apparatus of claim 9, wherein the optical plate is formed on a light exiting surface of the display panel and the light exiting surface faces a light incident surface of the display panel into which the first polarized light transmitted by the polarizing plate is incident.

15. A method of manufacturing a display apparatus, the method comprising:
   forming a polarizing layer to transmit polarized light of incident light on a display panel;
   forming a phase delaying film on the polarizing layer, the phase delaying film to delay a phase of the polarized light; and
   forming a phase delaying layer comprising a first pattern and a second pattern, the first pattern to delay the phase of the polarized light delayed by the phase delaying film by $3\lambda/4$, and the second pattern to delay the phase of the polarized light by $\lambda/4$, wherein forming the phase delaying layer comprises forming the second pattern comprising an isotropic optical portion and an anisotropic optical portion, and an optical layer is partially transformed by heating the phase delaying film.

16. The method of claim 15, wherein the optical layer is a single layer that delays the polarized light by $3\lambda/4$ to form the isotropic optical portion, and the phase delaying film under the isotropic optical portion remains untransformed to form the anisotropic optical portion that delays the phase of the polarized light by $\lambda/4$.

17. The method of claim 15, wherein forming the phase delaying film comprises:
   forming a first optical film, the first optical film to delay the phase of the polarized light by $\lambda/4$; and
   forming a second optical film disposed on the first optical film, the second optical film to delay a phase of light passed through the first optical film by $\lambda/2$.

18. The method of claim 17, wherein forming the phase delaying layer comprises heating the second optical film to form an isotropic optical layer in a portion of the second optical film.

19. The method of claim 15, wherein forming the phase delaying layer comprises forming an anisotropic optical pattern on the phase delaying film, the anisotropic optical pattern delays a phase of light passing through the phase delaying film by $\lambda/2$ and being spaced apart from each other, the phase delaying film being a single layer that delays the phase of the polarized light by $\lambda/4$.

20. The method of claim 15, further comprising:
   forming a polarizing plate on a light incident surface of the display panel into which external light is incident,
   wherein the phase delaying film is formed on a light exiting surface facing the light incident surface of the display panel, and light passing through the display panel exits from the light exiting surface.

* * * * *